(12) United States Patent
Nakamura et al.

(10) Patent No.: US 6,264,412 B1
(45) Date of Patent: Jul. 24, 2001

(54) HONEYCOMB PANEL FIXING DEVICE

(75) Inventors: Tetsuya Nakamura; Yoshihiko Goto; Tadashi Torigoe; Makiko Iida, all of Otawara (JP)

(73) Assignee: Sakura Rubber Co., Ltd. (JP)

( * ) Notice: Subject to any disclaimer, the term of this patent is extended or adjusted under 35 U.S.C. 154(b) by 0 days.

(21) Appl. No.: 09/490,536

(22) Filed: Jan. 25, 2000

(30) Foreign Application Priority Data

Jan. 26, 1999 (JP) .................................................. 11-016809

(51) Int. Cl.$^7$ ............................. F16B 21/18; F16B 39/00
(52) U.S. Cl. .................... 411/352; 411/82.1; 411/107; 411/546
(58) Field of Search .................. 411/82.5, 82.1, 411/82.3, 107, 352, 353, 533, 546, 999

(56) References Cited

U.S. PATENT DOCUMENTS

| | | | |
|---|---|---|---|
| 2,957,196 | * 10/1960 | Kreider et al. | 411/546 X |
| 3,041,912 | * 7/1962 | Kreider et al. | 411/107 X |
| 3,504,723 | * 4/1970 | Cushman et al. | 411/82.1 |
| 4,399,642 | 8/1983 | Bard et al. . | |
| 4,717,612 | 1/1988 | Shackelford . | |
| 4,729,705 | 3/1988 | Higgins . | |
| 4,800,643 | 1/1989 | Higgins . | |
| 4,846,612 | * 7/1989 | Worthing | 411/82.1 |
| 4,930,959 | * 6/1990 | Jagelid | 411/533 X |
| 4,941,785 | 7/1990 | Witten . | |
| 5,013,613 | 5/1991 | Gojny et al. . | |
| 5,082,405 | 1/1992 | Witten . | |
| 5,093,957 | 3/1992 | Do . | |
| 5,240,543 | 8/1993 | Fetterhott et al. . | |
| 5,378,099 | 1/1995 | Gauron . | |
| 5,480,729 | 1/1996 | Hattorl et al. . | |

FOREIGN PATENT DOCUMENTS 2 712 356    8/1993   (FR) .

* cited by examiner

Primary Examiner—Neill Wilson
(74) Attorney, Agent, or Firm—Harness, Dickey & Pierce, P.L.C.

(57) ABSTRACT

A honeycomb panel fixing device includes a honeycomb panel having a through-hole formed through a honeycomb core thereof in its thickness direction, a bushing inserted into the through-hole, and a fixing bolt for fixing the honeycomb panel to a target object by the bushing. The bushing includes a first cylindrical member inserted into the through-hole from the front of the honeycomb panel and having a first hole at a bottom thereof, the fixing bolt being inserted into the first hole, a second cylindrical member inserted into the through-hole from behind the honeycomb panel and having a second hole at a bottom thereof, the fixing bolt being inserted into the second hole, and a detach-prevention member fixed to the fixing bolt in the second cylindrical member and thus engaged with the second cylindrical member.

4 Claims, 6 Drawing Sheets

HONEYCOMB PANEL FIXING DEVICE

BACKGROUND OF THE INVENTION

The present invention relates to a honeycomb panel fixing device for fixing a honeycomb panel, which is used as an interior material of a manned spacecraft, to a framework and the like.

As an interior material of a manned spacecraft, a light, strong honeycomb panel is employed. If the honeycomb panel is fixed to a structure such as a framework, using a fixing bolt through the honeycomb panel in order to design the interior of the spacecraft, there occurs a drawback in which the honeycomb panel will be crushed by pressure of a head portion of the fixing bolt.

A prior art fixing device for fixing a honeycomb panel to a structure such as a framework, is disclosed in U.S. Pat. Nos. 5,378,099, 5,240,543, 5,093,957, 5,082,405, 5,013,613, 4,941,785, 4,800,643, 4,729,705, 4,717,612, and 5,480,729.

Another prior art fixing device is shown in FIG. 7 as a structure for fixing a honeycomb panel. Referring to FIG. 7, a through-hole 2 is formed through a honeycomb panel 1 in its thickness direction, and a bushing 3 is inserted into the through-hole 2. The bushing 3 is constituted of synthetic resin and shaped like a cylinder with a bottom. A bolt hole 4 is formed in the bottom of the bushing 3 and a flange section 5 is provided at the opening thereof.

In order to design the interior by fixing the honeycomb panel 1 to a structure 6 such as a framework, an adhesive 7 or a potting material is applied to the inner surface of the through-hole 2, and then the bushing 3 is inserted into the through-hole 2 and fixed adhesively to the honeycomb panel 1. If a fixing bolt 8 is screwed into a screw hole 9 of the structure 6, the flange section 5 of the bushing 3 is bonded to the honeycomb panel 1, and the honeycomb panel 1 is fixed to the structure 6 by means of the bushing 3.

However, the honeycomb panel 1 has an error in thickness when it is formed, though the bushing 3 is formed without any error in dimension. If the honeycomb panel 1 is thin and its level is lower than the height of the bushing 3, a gap g will be created between the back of the honeycomb panel 1 and the structure 6 as shown in FIG. 8, and the honeycomb panel 1 cannot be fixed firmly to the structure 6.

On the other hand, if the honeycomb panel 1 is thick and its level is higher than the height of the bushing 3, as shown in FIG. 9, there will occur a problem in which a gap g will be created between the bottom of the bushing 3 and the structure 6, and the flange section 5 is strongly pressed on the edge of the opening of the through-hole 2 by tightening the fixing bolt 8, thereby deforming the honeycomb panel 1.

If, furthermore, the flange section 5 is removed from the bushing 3, as shown in FIG. 10, in order to eliminate an error in dimension of the honeycomb panel 1, there will occur a problem in which the honeycomb panel 1 is separated from the structure 6 and floated under conditions of weightlessness, as indicated by a two-dot-one-dash line, without loosening the fixing bolt 8, if the adhesive 7 lacks its adhesive strength.

BRIEF SUMMARY OF THE INVENTION

An of the present invention is to provide a honeycomb panel fixing device capable of reliably fixing a honeycomb panel to a structure by eliminating an error in dimension of the honeycomb panel.

Another object of the present invention is to provide a honeycomb panel fixing device which prevents a honeycomb panel and a bushing from being floated under conditions of weightlessness even though an adhesive portion comes off due to incomplete adhesion between the honeycomb panel and bushing or an impact.

According to the present invention, even though a honeycomb panel has a dimension error in thickness, the dimension error can be eliminated since a bushing is constituted of first and second cylindrical members.

According to the present invention, even though a honeycomb panel and a bushing come off due to a lack of adhesion, a detach-prevention member fitted to a fixing bolt prevents the bushing from being separated and thus prevents the honeycomb panel and bushing from being floated under conditions of weightlessness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to FIGS. 1 to 4.

Figure 1:
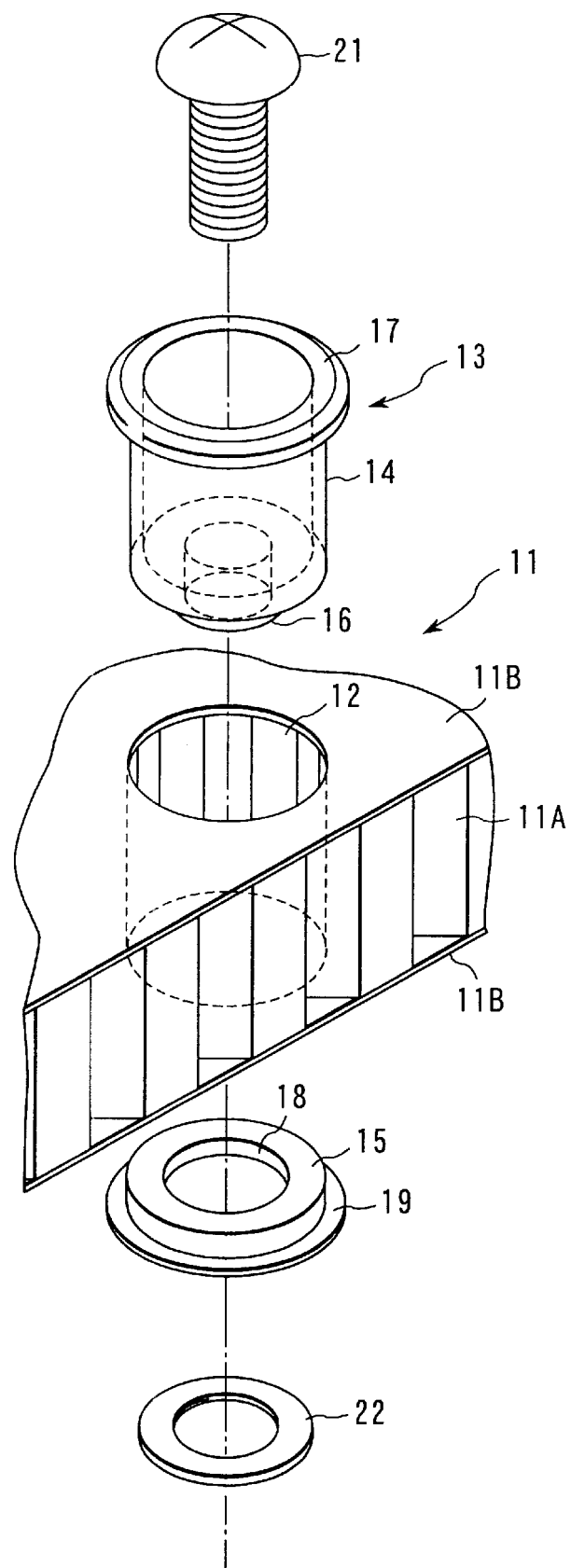
FIG. 1 is an exploded, perspective view of a honeycomb panel fixing device of the present invention.
Figure 2:
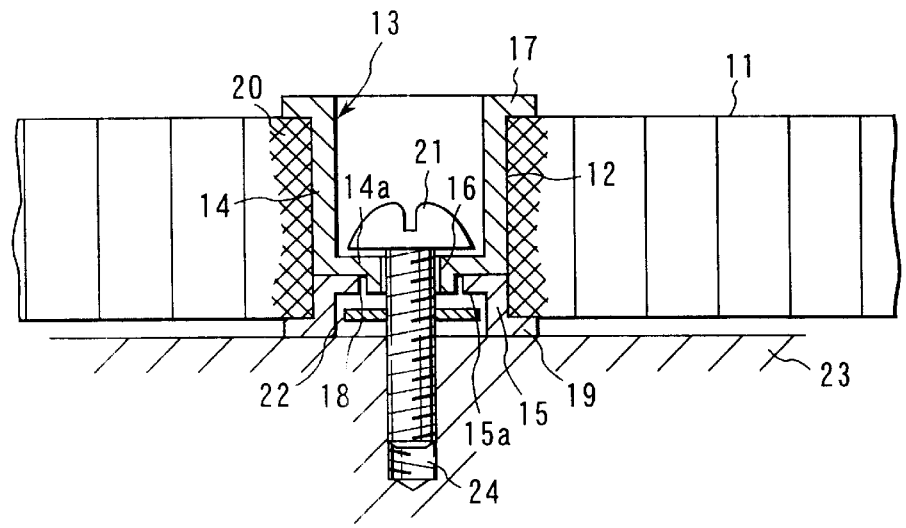
FIG. 2 is a vertical side view of the honeycomb panel fixing device of the present invention.
Figure 3:
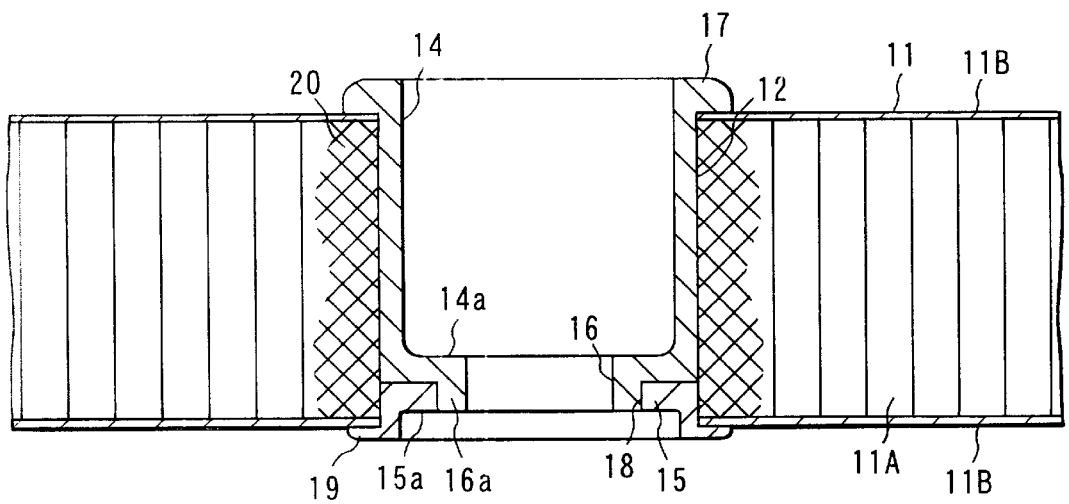
FIG. 3 is a vertical side view of a fixing structure for fixing a bushing to a honeycomb panel of the present invention.

FIG. 1 is an exploded, perspective view of a device for fixing a honeycomb panel, FIG. 2 is a vertical side view of the honeycomb panel fixing device, and FIG. 3 is a vertical side view showing a bushing fixed to the honeycomb panel.

As illustrated in FIGS. 1 to 3, a honeycomb panel 11, which is used as an interior material of a manned spacecraft, is constituted of a core member 11A having honeycomb hollows and sheet members 11B between which the core member 11A is sandwiched. The core member 11A is formed of aluminum, Nomex, ROHACELL (trademark), foaming material, cork or the like, while the sheet members 1B are formed of fiber reinforced plastics such as CFRP, KFRP, and GFRP.

A plurality of through-holes 12, each of which is two to three times or more than three times as large as each hollow of the honeycomb panel 11, are formed through the honeycomb panel 11 in its thickness direction. A bushing 13 is inserted into its corresponding through-hole 12.

The bushing 13 includes a first cylindrical member 14 and a second cylindrical member 15 which are both constituted of metal, such as aluminum, stainless steel, titanium, and Inconel, or polyamide-imide resin.

The first cylindrical member 14 has a bottom 14a and an outside diameter such that it can be inserted tightly into the through-hole 12. The bottom 14a of the member 14 is provided with a bolt hole 16 and the opening thereof is provided with a flange section 17 whose diameter is larger than that of the through-hole 12. A projected cylindrical portion 16a, which is projected in the bottom direction of the first cylindrical member 14, is formed integrally with the bolt hole 16 as one component. The second cylindrical member 15 is a short one having a bottom 15a and an outside diameter such that it can be inserted tightly into the through-hole 12. The bottom 15a of the member 15 is provided with an insertion hole 18 fitted to the projected cylindrical portion 16a, and the opening thereof is provided with a flange section 19 whose diameter is larger than that of the through-hole 12.

If a cylindrical section of the first cylindrical member 14 is inserted into the through-hole 12 from the front of the honeycomb panel 11 and that of the second cylindrical member 15 is inserted therein from behind the honeycomb panel 11, the insertion hole 18 is fitted to the projected cylindrical portion 16a, and the flange sections 17 and 19 are bonded to the edge of the opening of the through-hole 12 of the sheet member 11B. In other words, the honeycomb panel 11 is sandwiched and fixed between the first and second cylindrical members 14 and 15.

A filler such as a potting material or an adhesive 20 is applied in advance to the inner surface of the through-hole 12. The outer surfaces of the first and second cylindrical members 14 and 15 are adhered to the inner surface of the through-hole 12.

A fixing bolt 21 is inserted into the bolt hole 16 of the first cylindrical member 14 and penetrates the second cylindrical member 15. The second cylindrical member 15 includes a retaining ring 22 as a detach-prevention member engaged with a screw portion of the fixing bolt 21. The retaining ring 22 is shaped like a disk and its diameter is larger than that of the insertion hole 18. The retaining ring 22 is placed into engaging with the second cylindrical member 15 to prevent the fixing bolt 21 from being detached from the bolt hole 16. In other words, even though the fixing bolt 21 is about to come out of the bolt hole 16, the first and second cylindrical members 14 and 15 are coupled to each other by means of the fixing bolt 21 and retaining ring 22 since the retaining ring 22 contacts the second cylindrical member 15.

An operation for designing the interior of, e.g., a manned spacecraft by fixing the honeycomb panel 11 to a structure 23 as a target object, will now be described. First, the adhesive 20 is applied to the inner surface of the through-hole 12, and then the cylindrical section of the first cylindrical member 14 is inserted into the through-hole 12 from the front of the honeycomb panel 11, and that of the second cylindrical member 15 is inserted into the through-hole 12 from behind the honeycomb panel 11. Thus, the insertion hole 18 is fitted to the projected cylindrical portion 16a, and the flange sections 17 and 19 are bonded to the edge of the opening of the through-hole 12 of the sheet member 11B.

Figure 5A:
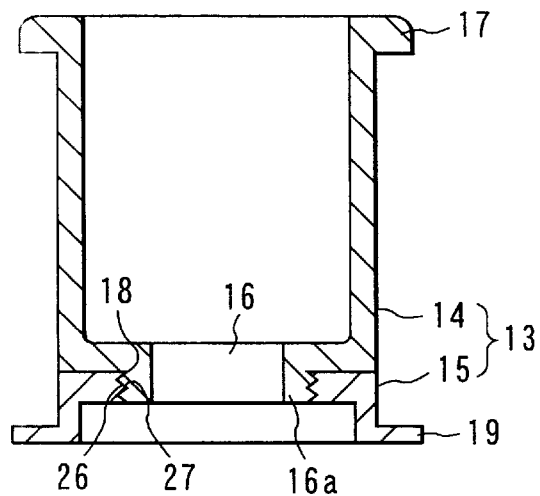
FIG. 5A is a vertical side view showing a first modification to a coupling structure of the bushing.

If, then, the first and second cylindrical members 14 and 15 are coupled to each other until the adhesive 20 is hardened, the interior designing is improved in operability. More specifically, FIG. 5A illustrates a first modification in which a male screw 26 provided on the projected cylindrical portion 16a of the first cylindrical member 14 is screwed into a female screw 27 provided in the insertion hole 18 of the second cylindrical member 15.

Figure 5B:
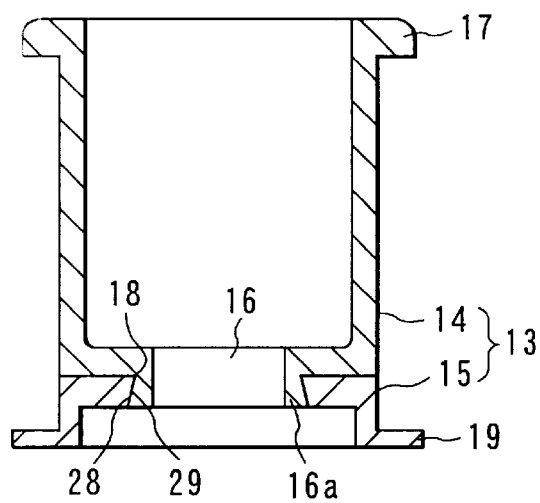
FIG. 5B is a vertical side view showing a second modification to the coupling structure of the bushing.

FIG. 5B shows a second modification in which the projected cylindrical portion 16a of the first cylindrical member 14 has a first tapered surface 28 and the insertion hole 18 of the second cylindrical member 15 has a second tapered surface 29 opposed to the first tapered surface 28, and the first and second tapered surfaces 28 and 29 are fitted to each other.

Figure 5C:
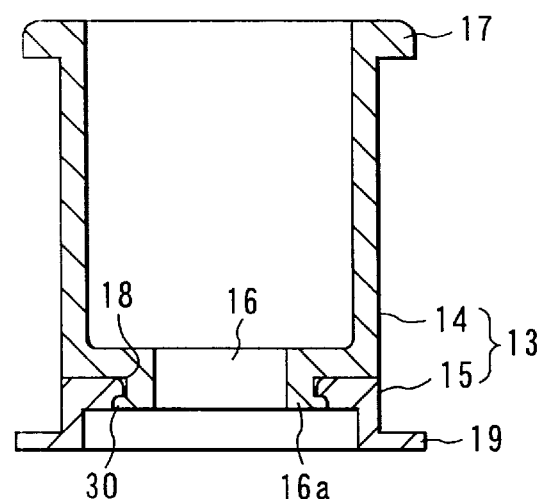
FIG. 5C is a vertical side view showing a third modification to the coupling structure of the bushing.

FIG. 5C depicts a third modification in which the projected cylindrical portion 16a of the first cylindrical member 14 has a ring-shaped convex portion 30 and the inner surface of the insertion hole 18 of the second cylindrical member 15 is engaged with the ring-shaped convex portion 30.

Then, the fixing bolt 21 is inserted into the bolt hole 16 from the opening of the first cylindrical member 14, and the retaining ring 22 is engaged with the screw portion of the fixing bolt 21 to prevent the fixing bolt 21 from coming out of the opening of the second cylindrical member 15. If, in this state, the fixing bolt 21 is screwed into a screw hole 24 of the structure 23, the head portion of the fixing bolt 21 is placed into contact with the bottom 14a of the first cylindrical member 14, and the honeycomb panel 11 is fixed to the structure 23 by means of the first and second cylindrical members 14 and 15.

Figure 4:
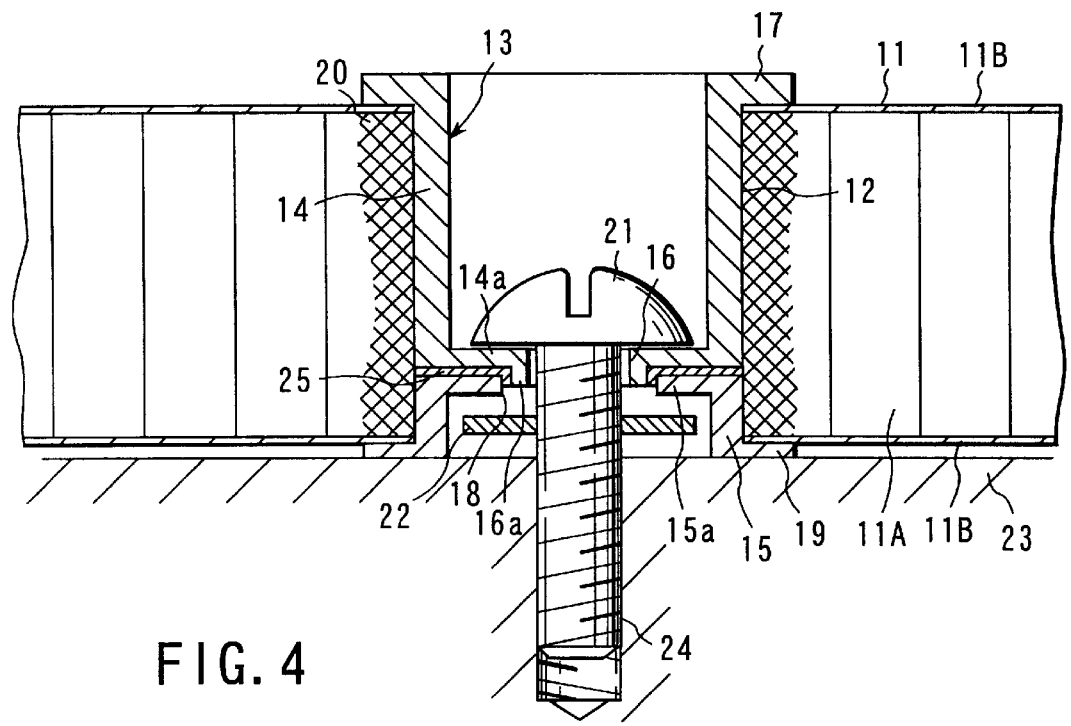
FIG. 4 is a vertical side view showing a fixing state of a thick honeycomb panel of the present invention.
Figure 7:
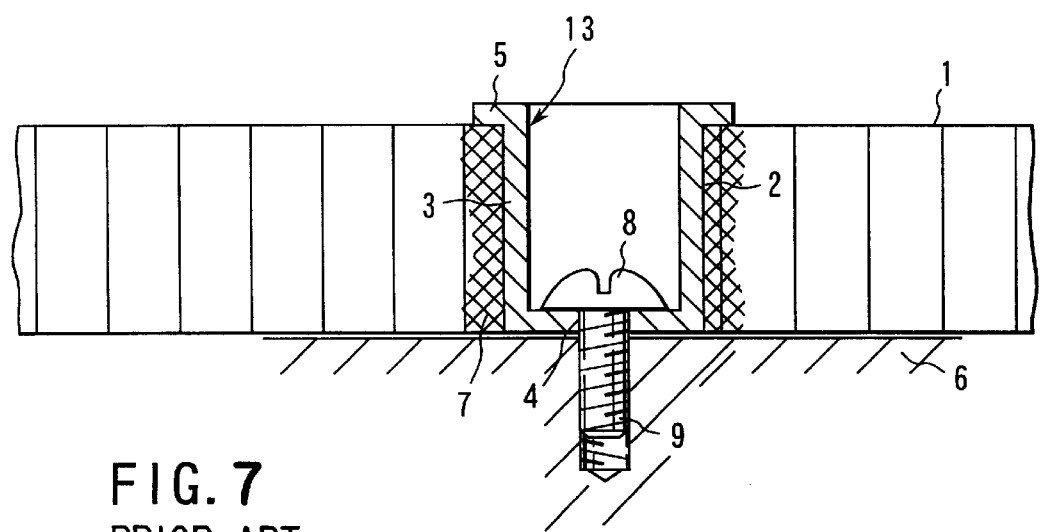
FIG. 7 is a vertical side view of a prior art honeycomb panel fixing structure.

A clearance between the back of the honeycomb panel 11 and the structure 23, which corresponds to the thickness of the flange section 19 of the second cylindrical member 15, can be made constant. If the honeycomb panel 11 is thicker than usual, a gap 25 is formed between the first and second cylindrical members 14 and 15, as shown in FIG. 4, and the adhesive 20 flows into the gap 25. If the adhesive 20 is hardened, it acts as a shim to eliminate a dimension error in thickness of the honeycomb panel 11. If, furthermore, the adhesive 20 is hardened, the first and second cylindrical members 14 and 15 are increased in coupling strength.

According to the honeycomb panel fixing device so constructed, the honeycomb panel 11 is engaged with the flange sections 17 and 19 of the first and second cylindrical members 14 and 15 and thus not separated from the bushing 13 or floated. Even though an adhesive portion between the honeycomb panel 11 and bushing 13 comes off due to a lack of the adhesive 20 or an impact, neither of the first and second cylindrical members 14 and 15 and fixing bolt 21 is floated under conditions of weightlessness, since the first cylindrical member 14 is fitted to the head portion of the fixing bolt 21 and the second cylindrical member 15 is fixed by the retaining ring 22 to prevent the fixing bolt from being detached from the member 15.

Figure 6A:
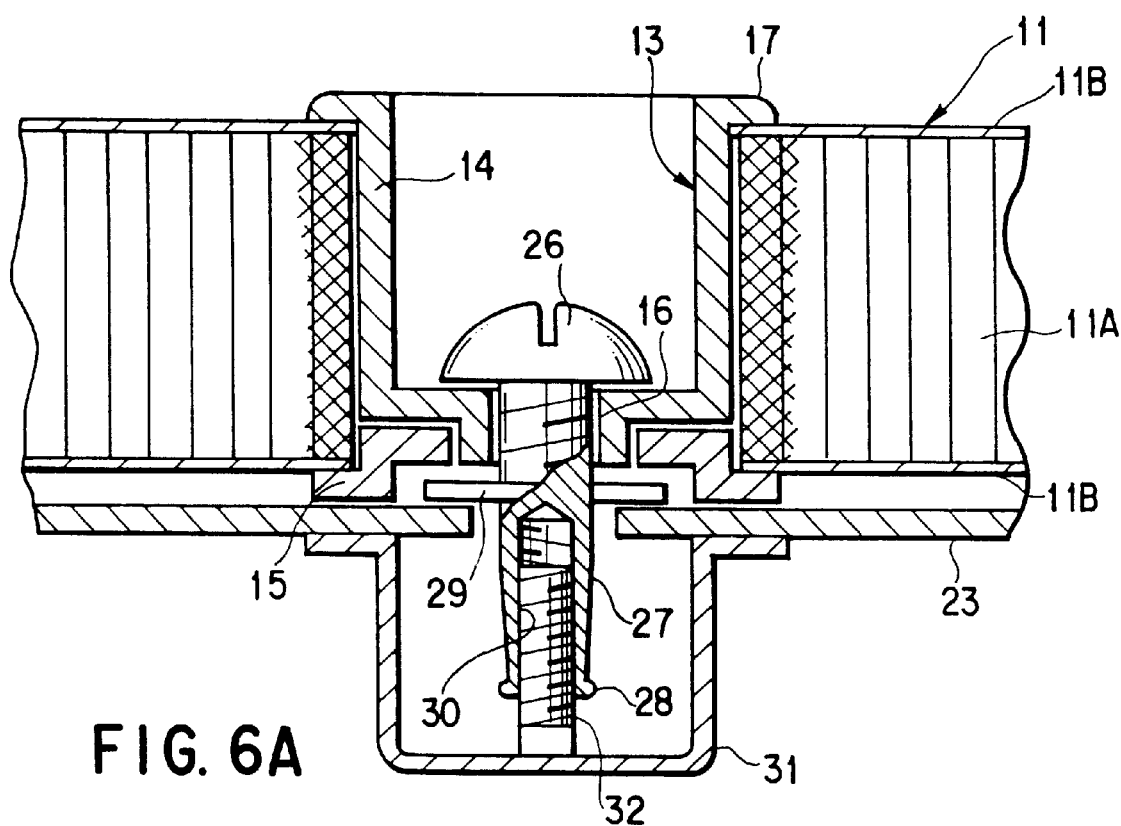
FIG. 6A is a vertical side view showing a modification to the fixing structure for fixing the honeycomb panel of the present invention.
Figure 6B:
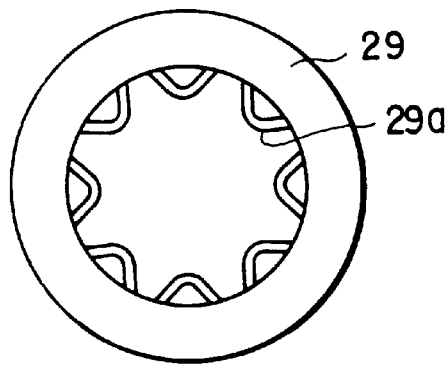
FIG. 6B is a perspective view showing a modification to a retaining ring of the present invention.
Figure 8:
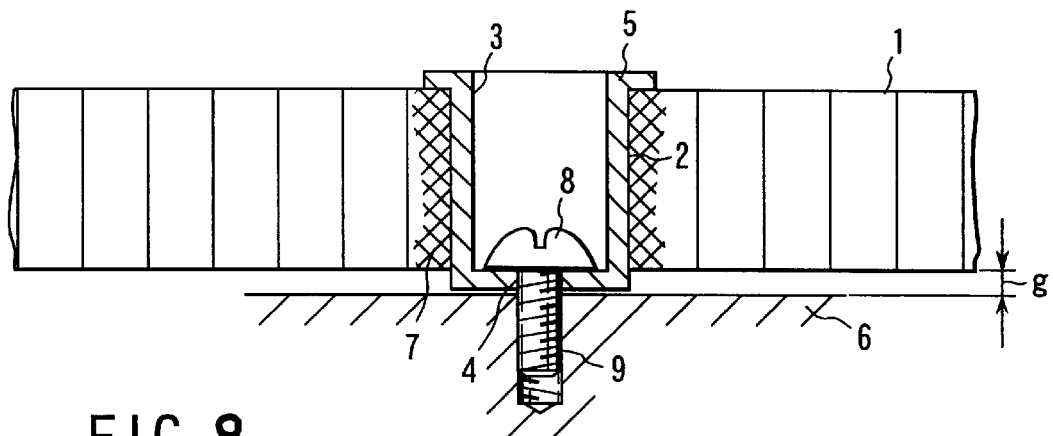
FIG. 8 is a vertical side view of a prior art honeycomb panel fixing structure.
Figure 9:
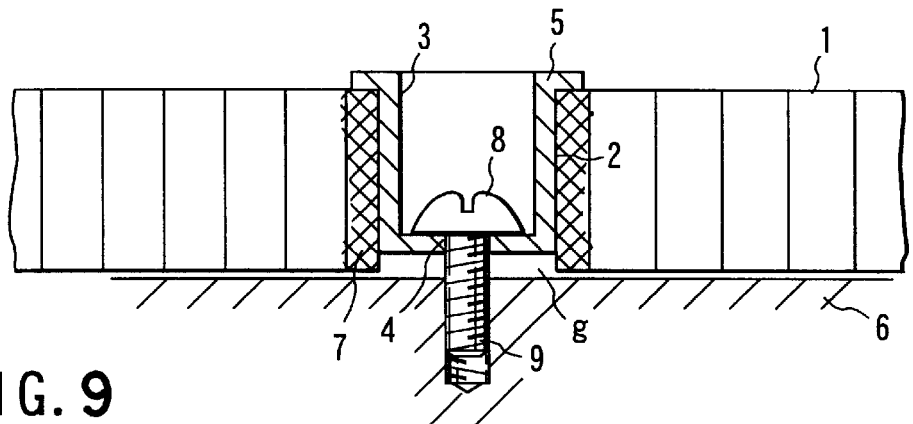
FIG. 9 is a vertical side view of a prior art honeycomb panel fixing structure.
Figure 10:
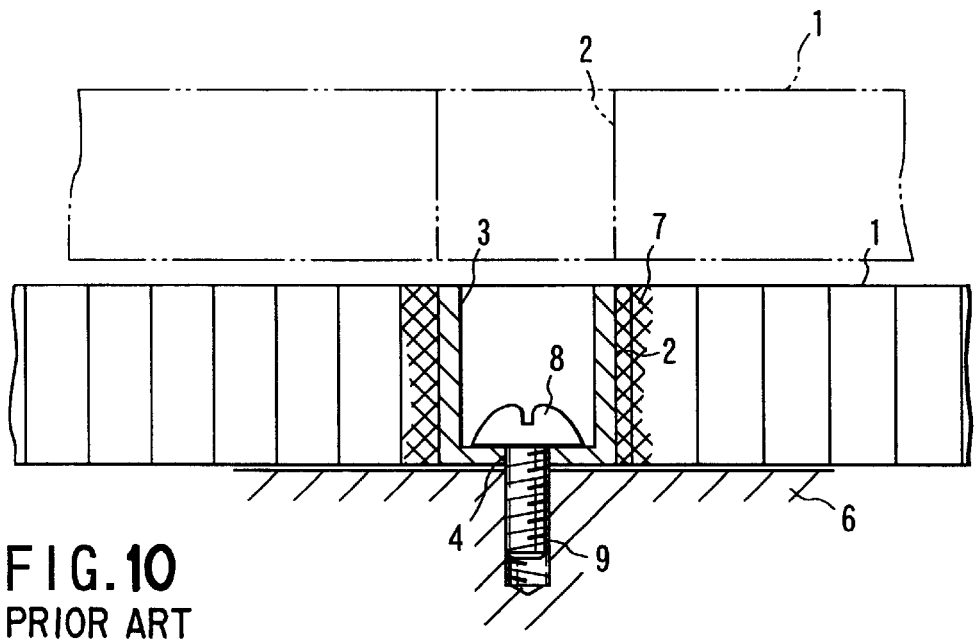
FIG. 10 is a vertical side view of a prior art honeycomb panel fixing structure.

FIGS. 6A and 6B illustrate modifications to the fixing device of the present invention. According to the modifications, a ring-shaped convex portion 28 is provided at an end portion of a shaft 27 of a fixing bolt 26. A retaining ring 29 having a plurality of lugs 29a on its inner circumference is fitted to the shaft 27. The ring-shaped convex portion 28 of the shaft 27 prevents the retaining ring 29 from being detached from the shaft 27.

Moreover a screw hole 30 is formed coaxially in the shaft 27 of the fixing bolt 26 from the top thereof. A coupling bolt 32 protruded from a cap member 31 of the structure 23 is fitted into the screw hole 30. Thus, the honeycomb panel 11 is fixed to the structure 23 through the first and second cylindrical members 14 and 15 by means of the fixing bolt 26 and coupling bolt 32.

The foregoing embodiment is directed to fixing of a honeycomb panel as an interior material of a manned spacecraft. However, the present invention is not limited to such an interior material. In the above embodiment, the retaining ring 22 is engaged with the fixing bolt 21 as a detach-prevention member. However, the detach-prevention member is not limited to the retaining ring, but can be replaced with a rectangular plate member or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A honeycomb panel fixing device comprising:
   a honeycomb panel having a through-hole formed therethrough in a thickness direction;
   a bushing inserted into the through-hole; and
   a fixing bolt for fixing the honeycomb panel to a target object by the bushing,
   the bushing including:
   a first cylindrical member inserted into the through-hole from a front of the honeycomb panel and having a first hole at a bottom thereof, the fixing bolt being inserted into the first hole;
   a second cylindrical member inserted into the through-hole from behind the honeycomb panel and having a second hole at a bottom thereof, the fixing bolt being inserted into the second hole;
   a gap corresponding to a thickness of the honeycomb panel formed between the bottom of the first cylindrical member and the bottom of the second cylindrical member;
   an adhesive disposed in the gap; and
   a detach-prevention member fixed to the fixing bolt in the second cylindrical member and thus engaged with the second cylindrical member.

2. A honeycomb panel fixing device according to claim 1, wherein the detach-prevention member has an outside diameter which is larger than the diameter of the second hole of the second cylindrical member.

3. A honeycomb panel fixing device comprising:
   a honeycomb panel having a through-hole formed therethrough in a thickness direction;
   a bushing inserted into the through-hole; and
   a fixing bolt for fixing the honeycomb panel to a target object by the bushing,
   the bushing including:
   a first cylindrical member inserted into the through-hole from a front of the honeycomb panel, the first cylindrical member having an outer surface adhered to the through-hole and a first hole at a bottom thereof, the fixing bolt being inserted into the first hole;
   a second cylindrical member inserted into the through-hole from behind the honeycomb panel, the second cylindrical member having an outer surface adhered to the through-hole and a second hole at a bottom thereof, the fixing bolt being inserted into the second hole; and
   a detach-prevention member fixed to the fixing bolt in the second cylindrical member and thus engaged with the second cylindrical member.

4. A honeycomb panel fixing device comprising:
   a honeycomb panel having a through-hole formed therethrough in a thickness direction;
   a bushing inserted into the through-hole; and
   a fixing bolt for fixing the honeycomb panel to a target object by the bushing,
   the bushing including:
   a first cylindrical member inserted into the through-hole from a front of the honeycomb panel and having a first hole at a bottom thereof, the fixing bolt being inserted into the first hole;
   a second cylindrical member inserted into the through-hole from behind the honeycomb panel and having a second hole at a bottom thereof, the fixing bolt being inserted into the second hole; and
   a detach-prevention member fixed to the fixing bolt in the second cylindrical member and thus engaged with the second cylindrical member,
   wherein the first cylindrical member and the second cylindrical member have a coupling portion at which the first cylindrical member and the second cylindrical member are coupled to each other until an adhesive is hardened.

* * * * *